United States Patent [19]

French

[11] Patent Number: 4,776,921

[45] Date of Patent: Oct. 11, 1988

[54] APPARATUS FOR THERMOBONDING SEAMS IN THERMOPLASTIC MATERIAL

[75] Inventor: Robert C. French, El Toro, Calif.

[73] Assignee: BodiGard Technologies, Inc., Buffalo Grove, Ill.

[21] Appl. No.: 18,772

[22] Filed: Feb. 27, 1987

Related U.S. Application Data

[63] Continuation of Ser. No. 669,305, Nov. 7, 1984, abandoned, Continuation-in-part of Ser. No. 517,824, Jul. 26, 1983, Pat. No. 4,555,293.

[51] Int. Cl.$^4$ ............................................. B29C 65/22
[52] U.S. Cl. ................................... 156/581; 156/583.1
[58] Field of Search ............ 156/157, 251, 290, 308.2, 156/308.4, 285, 515, 581, 583.1; 101/9, 27, 31; 100/93 P; 53/416; 493/189, 203; 264/248, 331.11; 425/405 R, 122; 219/10.53

[56] References Cited

U.S. PATENT DOCUMENTS

| | | | |
|---|---|---|---|
| 2,589,756 | 3/1952 | Waters | 156/581 X |
| 2,653,646 | 9/1953 | Swartz | 156/581 X |
| 2,994,361 | 8/1961 | Gable et al. | 264/248 |
| 3,028,576 | 4/1962 | Gerard | 156/515 X |
| 3,250,660 | 5/1966 | Greig et al. | 156/581 |
| 3,466,214 | 9/1969 | Polk et al. | 264/248 |
| 3,536,568 | 10/1970 | Rothstein | 156/515 |
| 4,135,957 | 1/1979 | Voller | 156/581 X |
| 4,240,865 | 12/1980 | Kyts | 156/581 X |

Primary Examiner—Michael W. Ball
Assistant Examiner—Ramon R. Hoch
Attorney, Agent, or Firm—George H. Gerstman

[57] ABSTRACT

Method and device for sealing thermoplastic material. A support plate (16) supports sheets (29, 31) of the thermoplastic material, and a heat element (18) is provided adjacent thereto. A pressure plate (20) mates with the support plate and includes recess means (24) for receiving the heat element means. A confined melt zone (35) is formed between the heat element and the pressure plate (or the recess means) when they are in mating relationship. The confined melt zone serves to confine the melted thermoplastic material to form a good seal by relieving stress between the seal and the seal-material interface. The heat element and recess means are manufactured as interchangeable dies in different sizes and shapes for different materials. The heat element may be formed into different shapes, such as a glove for manufacturing gloves.

23 Claims, 6 Drawing Sheets

APPARATUS FOR THERMOBONDING SEAMS IN THERMOPLASTIC MATERIAL

This application is a continuation of U.S. application Ser. No. 669,305, filed Nov. 7, 1984, now abandoned, which is a continuation-in-part of U.S. application Ser. No. 517,824, filed July 26, 1983, now U.S. Pat. No. 4,555,293.

TECHNICAL FIELD

The present invention concerns a novel method and apparatus for heat sealing thermoplastic materials which heretofore have been difficult to seal.

BACKGROUND ART

Many synthetic cloth-like materials are available on the market. The synthetic materials are made of thermoplastic and formed as woven and non-woven types. Some of these synthetic cloths include materials generally known as "Tyvek," which is a trademark of E. I. DuPont de Nemours & Co., Wilmington, Del. 19898; "Duraguard" and "Safeguard," which are trademarks of Kimberly-Clark Corporation, Roswell, Ga. 30076; "Celestra," which is a trademark of Crown Zellerbach Corporation, Washougal, Wash. 98671; and "Duralace," which is a trademark of Chicopee Manufacturing Co., Chicopee, Ga. 30501. These materials are utilized as substitutes for cloth and pulp-paper in items such as envelopes and disposable clothes for medical, industrial and retail markets. Many such applications require that the material be joined at a seam, and in this respect some difficulty is encountered in the prior art.

In the prior art, the seams in the material for forming, for example, disposable coveralls, are often formed by sewing it much like cloth, or by using adhesive, including heat-sensitive adhesives. Sewing of the material causes pinholes which makes the completed item of clothing undesirable for use in dust-free and sterilized environments. Use of adhesives to form bonding requires special adhesives and complicates the manufacturing procedure. Furthermore, it is difficult to obtain a good seal bond along a seam by using adhesives.

Various heat seal methods have been attempted, but they have not proved to be satisfactory. In many instances the seal obtained exhibits a "zipper" effect, in that the seal has random intermittent breaks or weak points which affect the quality of the seal at the seam.

SUMMARY OF THE INVENTION

It is an object of the present invention to provide a heating and press die arrangement for forming seam seals free of "zipper" effect in sheets of thermoplastic material.

It is another object of this invention to control the size and shape of the seam seal by selecting the proper dimensions for a heating element in one of the die members, and for a recess in the other die member; and by correlating these dimensions to the thickness and compression of the thermoplastic sheet material.

It is still another object of the invention to form two adjacent seals, side by side, with a crimped or tear region therebetween, or to form edge joints or intermittent joints.

Another object of the invention is to relieve the stress between the seam seal and the seal-material interface to provide a more secure and strong bond.

A further object of the invention is to allow confined material to be heated from different directions, simultaneously or independently.

A still further object of the invention is to form a uniform seal bond by controlling the humidity at the work-station, the pressure applied to the confined material and the duration thereof, and the heat supplied and the duration thereof.

These and other objects are realized and distinct advantages obtained in the present invention.

The present invention is a method and apparatus for thermobonding thermoplastic cloth-like material along a seam. A support plate is provided for supporting sheets of thermoplastic material to be bonded together and a heat element having a first cross-section is provided adjacent to, or in a seat in, the support plate. Pressure plate means are provided for mating with, and applying pressure to, the support plate. Recess means configured to receive the heat element means are provided adjacent to or with the pressure plate means. When the pressure plate means engages the support plate, the material sheets are confined and clamped therebetween.

In general cross-sectional configuration, the heat element means may comprise a similar arc of a circle or ellipse, rectangle, triangle, etc. When the recess means and the heat element means are in mating relationship, a melt zone comprising a void is formed therebetween. The melt zone is the region within which melted portions of the thermoplastic material can accumulate and be confined to form a seal. It is also a region that serves to relieve the stress between the seal and the material interface.

If two melt zone means are provided, a crimping region may be provided between them. At the crimping region a greater pressure is applied to cause a "draw down" (i.e., pull) of the material into neighboring melt zone means to form a tear.

If a crimping region is not desired, a round or flat ribbon with its ends rounded may be used as a heating element. The region of the rounded ends of the flat ribbon serves as the stress relieving region which relieves the stress between the melt and the melt-material interface. With the round wire as the heating element the dimensions of the recess means is selected to avoid the pressure bearing crimping zone.

The support plate and pressure plate means may be provided with insulating material which may optimally be slightly resilient to aid in clamping the sheets of the material therebetween. If the insulating material is formed as a Teflon-impregnated fiberglass in the recess means, it would act as flow channel to control the melt flow of the material.

The length of heat element means may be contoured to form different shapes, for example, a glove. For such purposes, the cross-section of the heat element means may have a support portion to anchor it, and an outer exposed portion comprising an elongated member with rounded edges.

The heat element means may be configured to provide only an edge joint, lap joint, butt joint, intermittent lap, or intermittent edge joints.

The heat element means may be directly heated, i.e., it may comprise an electrically heated wire, or be indirectly heated through heating means imbedded adjacent thereto.

The recess means may be split, i.e., formed as first and second recess means, each configured to mate with only a portion of the heat element means. With this configuration the crimping zone is absent, and the result is two neighboring bond seals (they may be parallel, but that is not essential).

In forming a glove it has been discovered that if the top and the bottom of the glove are equal in size, the bottom will fit improperly and there will be substantial folding in the underside of the hand when the glove is worn. In order to alleviate this problem, two sheets of thermoplastic material are conveyed, in overlying relationship, to a mold formed of pressure means for applying pressure on one side of the sheets and a heat element that is provided on the other side of the sheets. The heat element is provided in a longitudinal configuration of the desired glove to be formed. The pressure means defines a cavity therein, with the cavity opening facing the heat element. During operation of the pressure means and the heat element on the sheets of thermoplastic material, air is evacuated from the cavity to draw a portion of one of the sheets into the cavity. The sheet that is drawn into the cavity is the top of the glove. In this manner, the top of the formed glove will have a greater thermoplastic material area than the bottom of the formed glove.

This process and apparatus, utilizing a pressure means defining a cavity for drawing one of the sheets therein, is also applicable to other garments wherein one layer is intended to be unequal in size to the other layer. An air jet may be applied to the other side of the material being vacuum-drawn into the cavity in order to prevent overlapping and wrinkling.

The above heat element means and the recess means may be made in various sizes and shapes for thermoplastic sheets of different thickness, fabrication characteristic, and seam seal bond desired. With the proper heat element means and recess means, a good seam seal bond (i.e., one devoid of "zipper" effects) may be obtained by controlling the following factors:

(a) the humidity (H) of the work station (assuming that the material is at substantially similar humidity). Preferably H should be between about 27 and about 52 percent.
(b) pressure (P) applied on the recess means when it is in mating relationship with the heat element means with the seam edge of the material clamped therebetween. Preferably P should be between about 20 and about 60 p.s.i.
(c) initial temperature setting (T) of the heat element means. Preferably T should be between about 58° F. and about 72° F.
(d) raising the temperature of the heat element means to a range between a high ($t_h$) and a low ($t_1$). Preferably $t_h$ should be about 340° F. and $t_1$ should be about 125° F.
(e) time period ($h_t$) of supplied heat, i.e., the time during which factor (d) above is active. Preferably $h_t$ should be between about 0.38 seconds and about 5.51 seconds.
(f) dwell time "d", for which factor (e) above is active plus time thereafter that the pressure factor (b) above is continued. In other words, dwell time "d" is the time period during which pressure P is applied.

The various materials with which the above method may be practiced are those similar to DuPont's 1085, Tyvek (1444A, 1445A and 1443R); Kimberly-Clark's Safeguard and Duraguard; Chicopee's Duralace, and American Converter's Evolution.

The invention can be better understood by referring to the drawings and the detailed description.

BRIEF DESCRIPTION OF THE DRAWINGS

FIG. 10b is a perspective view of the joint formed by FIG. 10a.

FIG. 13 is a sectional view along line x—x of FIG. 1 showing heat element means particularly configured for seals having sharp bends.

DESCRIPTION OF THE PREFERRED EMBODIMENT

Initially it should be understood that the term "melt" used herein is intended to mean the state of the thermoplasaic material where it plasticizes, and cross-linking between different layers occurs to where they are amenable to be bonded together. "Melt" for purposes of this disclosure does not require that the material liquify.

Figure 1:
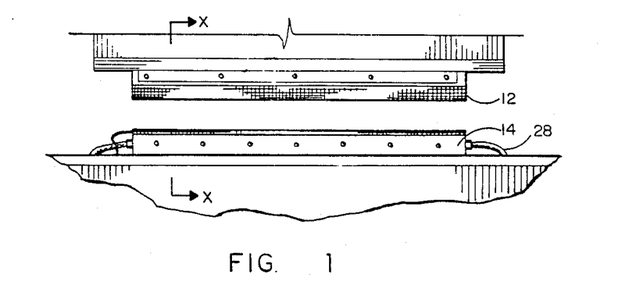
FIG. 1 is an elevational view of an arrangement of a die press containing the heat element to form seams.

FIG. 1 generally shows an arrangement of a press die 10 having an upper portion 12 and a lower portion 14. FIGS. 2, 3, 5-7, 9 and 13 are sectional views along line x—x of FIG. 1. The lower portion 14 includes a support plate 16 for supporting sheets of thermoplastic material thereon, and heat element means 18. The heat element means may be situated in a seat 17 in the support plate 16. The heat element means may comprise, for example, a wire that is spring loaded and held taut. The heat element means has a support portion 18b held within the lower portion 14 (in the seat 17) and an exposed portion 18a. The support portion 18b has a surface area 18c sufficient to be affected by the heating/cooling system 28 so that the heat of the heat element means 18 may be controlled.

The upper portion 12 comprises pressure plate means 20 provided for mating with and applying pressure on the support plate 16 and thereby clamping the material therebetween, and recess means 24 configured to receive the heat element means 18. The recess means may be a relief formed in the pressure plate means. The pressure plate means is preferably made of a slightly resilient material. A backup plate 26 provides rigidity and support for the pressure plate 20. The heating/cooling system 28 adjacent the heat element means 18 controls the heat thereof. A layer of insulating semi-resilient material 38 (FIG. 2) may be provided on both the pressure plate and the support plate 16. It is not essential that the insulating layer be present on both the pressure plate and the support plate, providing that only one of the two may suffice.

When the top and the bottom die are in an engaging or mating relationship, the heat element means 18 is received within the recess 24. The recess 24 is configured to apply a substantially crimping pressure at the point 33 and to leave a room or void 35 between the recess and the heat element means. The void 35 is the melt zone means and provides space for the material to melt and be contained to form a seal. Additionally the provision of the melt zone means serves to relieve tension and stress between the seal and the seal-material interface. The crimping zone 33 is a point where greater pressure is applied to cause the thermoplastic material 30 to be crimped. With the configuration of FIGS. 2 and 3 the resultant seal obtained is shown at FIG. 4. Two sheets of thermoplastic material 29 and 31 are joined at the region 36 which represents the seal formed in the melt zone means 35, and separated from each other at 34 which represents the region 33.

From the above it can be seen that the melt zone means is critical in terms of selecting the size and shape of the seal 36 to be formed. Assuming that A is the amount of the heat element means 18 that is retained within the seat 17 as measured from the outer surface of the support plate 16, and B represents the depth of the recess means 24, then a proper selection of A and B together with the dimensions for C and D and the shape of the heat element means 18 and recess means 24 will determine the shape and configuration of the melt zone means E. The triangular melt zone means E in FIG. 3a is only an illustration and not a representation of its shape or size. For purposes of this invention, the upper and lower portions 12 and 14 may be manufactured as replaceable and interchangeable die elements having different sizes and shapes. The proper die to be used will depend on the material and the seal desired.

In operation of the device of FIGS. 1-4, sheets of material 30 to be joined are placed and supported on the support plate 16, with the seam edge to be formed aligned with the heat element means 18. The upper portion 12 is brought into pressing engagement with the lower portion 14. The pressure plate 20 presses on the material 30 and the support plate 16 and clamps the material 30 therebetween. At the same time, the heat element means 18 with the material aligned therewith is received within the recess means 24. The depth to which the heat element is received within the recess means depends on the selection of dimensions for A and B for the particular material 30, the size and shape of the heat element means 18 and the type of seam seal bond desired, the thickness of the material and the compressability thereof. The recess means 24 is of a dimension to allow slippage of the material 30 over the contour of the heat element means 18 and still maintain a clamping effect thereon. At the point 33 the material 30 may be compressed to a greater degree than in the region of the melt zone means 35. To effect a good clamping, the material outside of the melt zone 35 may be compressed 20 percent to 45 percent from the total material thickness. The maximum recess dimension in the melt zone region may be the total material thickness around the heat element means 18 to a minimum of 50 percent of the material thickness.

The material being considered here has a certain compression factor based on compressibility of the material, the pressure plate means and the resiliency thereof under various loading conditions. The compression factor may be stated as F. For material sheets formed of polyethylene the compression factor is 0.47, for polypropylene it is 0.52, and for rayon acrylic it is 0.42.

Other factors that must be considered in adjusting A, B, C, D and E are the total thickness of the sheets that are situated and confined between the heat element means and the recess means and the thickness of the heat element means. The total thickness (G) would be the sum total of the thickness of each of the sheets that are stacked to be joined. The thickness (H) of the heat element means determine the amount thereof (H-A) that will protrude from the outer surface of the support plate means.

The following formula can be used as a guide to set A, B, F and G:

$$B = H - A + G(F - 1)$$

The temperature of heat element means is set for a certain high and low from its normal temperature at which it is maintained between operations. The pressure applied by the upper portion 12 is controlled and set differently depending on the material involved. A stop clock (not shown) is provided to set the heat time, i.e., the time period for which heat is applied by the heat element means to the material 30. Another clock setting provides the heat dwell time, i.e., the time setting for which the upper portion 12 remains pressed into engagement with the lower portion. The dwell time includes the time period during which heat is applied to the element means.

In FIG. 3a, the melt zone means 35 represent the "melting" region where the material portion 37 (see FIGS. 3b and 5b) will melt or plasticize and be bonded together into a seal. At the region 33, the pressure and heat causes a split or tear bond, as shown at 34 in FIG. 4. The importance of proper selection of A, B, C, D and E for a given F, G and H can be appreciated here. If the recess depth B is too much, a tear bond 34 will not form because of lack of the proper crimping pressure at point 33. This setting for B may be utilized where a wide seal is desired over the entire region of the surface of the outer exposed portion of the heat element means 18a. If the recess depth is too little, there is too much drawdown of the material at the melt 37 (see FIGS. 3b and 5b), which degrades the material interface 39 (see FIG. 5b) and may give rise to a "zipper" effect to the bond.

The material 30 is a loose array of spunbonded fibers. The effect of the heat and clamping pressure causes a stress buildup at the interface between the melt and the material, degrading the molecular chain. This degradation is minimized through the design selection of A, B, C, D and E and correlating it to F, G and H as stated above. The design of the heat element means 18 and the recess means 24 takes advantage of changes in physical properties when the material 30 is heated and stretched over the heat element means. In heating and stretching, cross-linking and molecular lineup occurs. The molecular chain bending or slipping across the stretch direction is impeded. This increases the integrity and strength of the seam seal formed.

Fiberglass layer

The surface of the support plate means 16, the pressure plate 20 and recess means 24 may be provided with several layers of insulating material 38, such as Teflon-impregnated fiberglass, Teflon or phenolic laminates. The fiberglass layer 38 acts as an insulator. Additionally, use of coarse insulating material over the pressure plate acts as flow channels to stabilize the melt flow.

Recess and heat element means interchangeable

Figure 2:
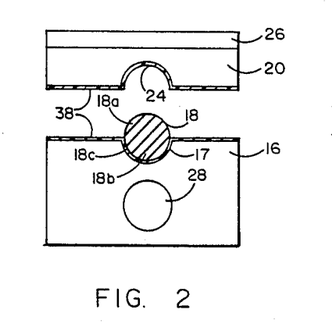
FIG. 2 is a sectional view along line x—x of FIG. 1 showing various parts of the present invention.
Figure 3A:
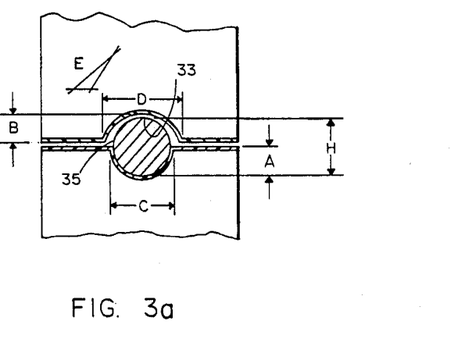
FIG. 3a is an arrangement showing the mating relationship of the device of FIG. 2 and the melt zone means.
Figure 3B:
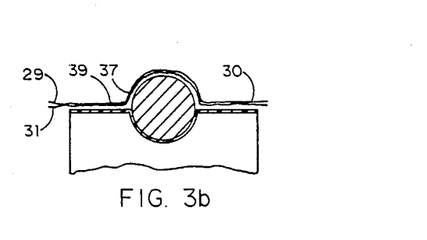
FIG. 3b is part of FIG. 3a showing the melt region and the melt-material interface.
Figure 4:
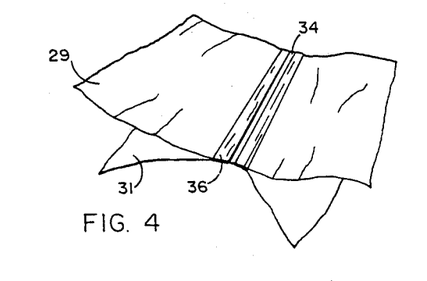
FIG. 4 shows a perspective view of a seam seal formed by the apparatus of FIGS. 2 and 3.

In FIGS. 1-3, it can be appreciated that the recess means 24 may be provided in the lower portion 14 and the heat element means may be situated in the upper portion 12. The operation of the apparatus will be the same. The same applies to all the other figures.

Other embodiments

Figure 5A:
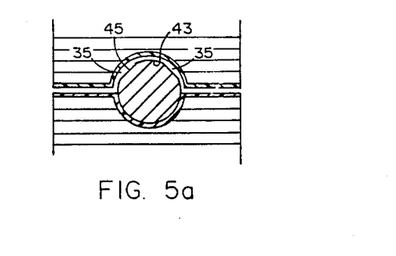
FIG. 5a is a sectional view along line x—x of FIG. 1 showing another embodiment of the melt zone means.
Figure 5B:
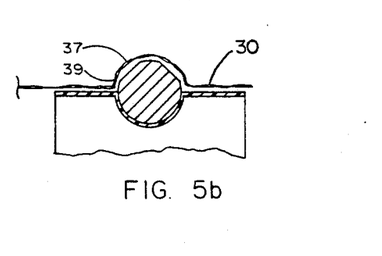
FIG. 5b is FIG. 5a showing the melt region and the melt-material interface of the thermoplastic sheets.

FIG. 5a shows another arrangement of the heat element means having crimping surface 43 and sloping sides 45. The sloping sides 45 provide the room for the melt zone means. The operation of FIG. 5 would be the same as in FIG. 3. FIG. 5b shows the region of the melt 37 on the material 30 and the melt-material interface at 39. The operation is the same as FIG. 3b.

Figure 6A:
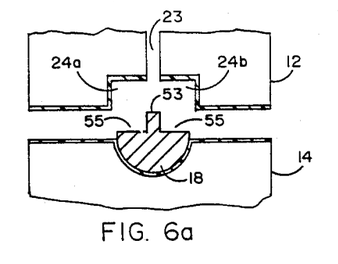
FIGS. 6a–6d are sectional view along line x—x of FIG. 1 showing a different embodiment of the melt zone means. It also shows split recess means.

Still another embodiment of the upper and lower portions 12 and 14 is shown in FIG. 6a. Here the heat element means 18 comprises lands 55. The recess means 24 is formed as 24a and 24b and a split zone 23. The split zone 23 and planar surface 53 are arranged such that crimping to form a tear bond, like 34 in FIG. 4, is avoided.

Figure 8:
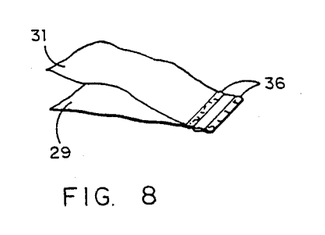
FIG. 8 is a perspective view of two sheets of the material with a dual seam.

In operation, the configuration of FIG. 6 provides the double-bonds 36 shown in FIG. 8. This may be useful for the manufacture of some items where a reinforced or double seal is desired. The double seal may or may not be parallel. The provision of the split recess means 24 allow different pressures to be applied and obtain seals having different characteristics.

Figure 6B:
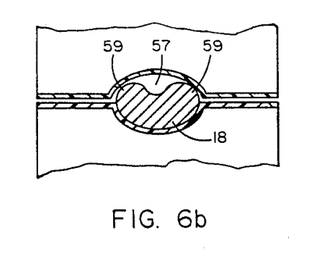

FIG. 6b shows another arrangement of the heat element means 18 with a channel 57 provided as the non-sealing region. The regions 59 are the sealing regions. The result is the double seal of FIG. 8. The configuration of FIG. 6b is particularly useful for parallel double seals.

Figure 6C:
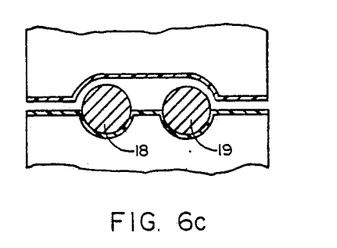
Figure 6D:
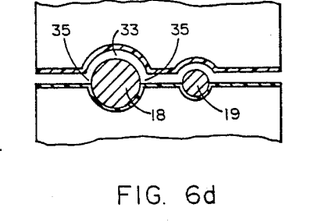

FIG. 6c uses dual heat element means 18 and 19. With this configuration dual seals may be obtained by selecting A and B (FIG. 3a) to avoid any crimping zone. The two heat element means 18 and 19 may be of different sizes, such as shown in FIG. 6d. In FIG. 6d, a crimp zone 33 may be provided in element 18 only. The result would be a double seam between the seal formed by heat element means 19 and one of the two melt zone means 35 of heat element means 18.

Figure 7:
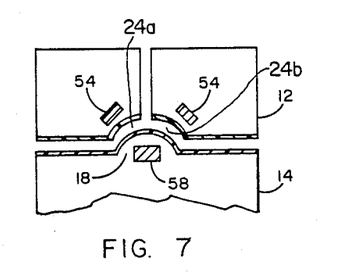
FIG. 7 is still another embodiment of the melt zone means.

In FIGS. 2-6 it has been suggested that the heat element means 18 may comprise a spring-tensioned wire that is directly heated (for example, through electrical means). FIG. 7 shows the arrangement where the heat element means 18 is heated through heating means 58, such as electrical wire, imbedded within the lower portion 14. The heating means 58 may also be a port for passage of heating gases. Additionally, the recess means 24a and 24b is provided with heating means 54, which may be an electrically heated wire. The provision of the heating means 54 and 58 may be useful in some applications where greater heat is required within the confines of the heat element means and the recess means 24 from two directions. For example, with some materials because of their thickness or composition, when trying to effect a melt-through, the material closest to the heating element may degrade. This is avoided by using plural heating means. By heating from the top and the bottom, the melt can be better controlled. In FIG. 7 the heat of the heat element means 18 and the recess means 24a and 24b may be independently controlled through heat troughs such as shown in FIG. 2 for heat element means 18.

Interchangeability

As with FIGS. 1-3, it should be understood that the heat element means 18 of FIG. 7 may be utilized with the recess means of FIGS. 2-6; and similarly the recess means 24a and 24b of FIG. 7 may be utilized with any of the heat element means in FIGS. 2-6. This interchangeability feature includes other features also.

Single edge joints

Figure 9A:
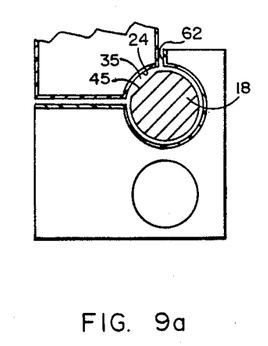
FIG. 9a is another embodiment of heat element means and recess means for forming a single edge joint.
Figure 9B:
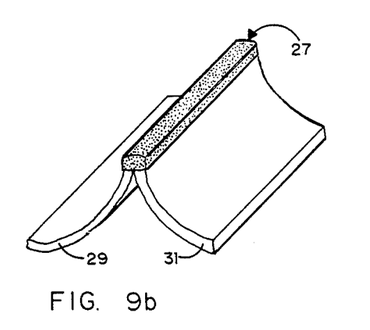
FIG. 9b is a perspective view of an edge seal.

FIGS. 9a-9b show formation of a single edge joint. The heat element means 18 has a single sloping face 45 to form the melt zone means 35. A stopper edge 62 is provided adjacent the heat element means to engage and position the edge 27 of the material layer 29 and 31. The heat element means 18 and recess means 24 operate in the same manner as described in FIGS. 1-8. Since only one edge joint is to be formed there is no provision in FIG. 9 for forming the tear bond 34 as shown in FIG. 4.

Flat ribbon element

FIGS. 1-9 have shown a circular cross-section for the heat element means. That should not be construed as a limitation of the present invention. For example, FIG. 10a shows a flat ribbon as the heat element means 18.

Here the outer surface of the ribbon has rounded edges which form the melt zone means 35.

Figure 10A:
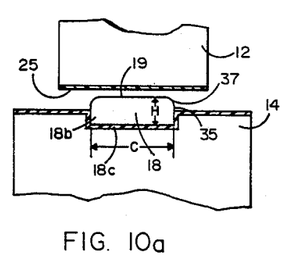
FIG. 10a is a sectional view along line x—x of FIG. 1 showing a flat ribbon heat element means.
Figure 10B:
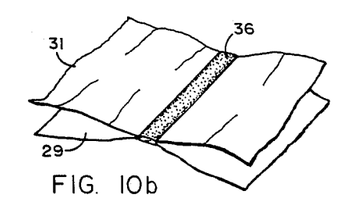

If the device of FIG. 10a is used only to form the seal 36, without forming a tear bond 34 (as in FIG. 4), then a crimping zone is not essential. FIG. 10b shows the bond 36.

It should also be noted that FIG. 10a does not show the recess means for receiving the heat element means. The upper portion 12 is shown as a flat member 25 that will compress, confine and hold the material sheets 29 and 31 into engagement with the heat element means. While the heat element means will heat and melt the materials in the seal region 37, the melt zone means serves to accumulate some of the material draw down as well as the region for transition from the seal to the material, i.e., the seal and seal-material interface. The edges 37 are rounded to prevent sharp edges and to assist in the material draw down into the melt zone means. It also provides a smooth transition from the seal heat face 19 to the melt zone means 35.

Thus while in FIGS. 1-9 the recess means in the upper portion 12 has been shown distinctly, that is only one suggested method of obtaining the melt zone means and one that is particularly useful and applicable when the heat element means is circular.

Figure 10C:
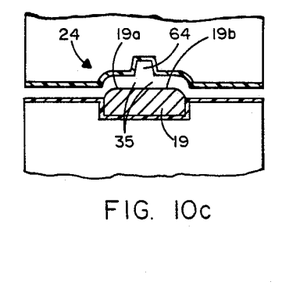
FIGS. 10c–10d are sectional views along x—x of FIG. 1 showing a flat ribbon used to obtain dual seals.

FIG. 10c shows use of a flat ribbon to obtain dual seals. Here a recess means 24 is provided and a channel 64 is formed therein representing the region where sealing pressure is not applied on the material 30 and a seal is avoided. Seals are formed in the region 19a and 10b and melt zone 35. The result of the device of claim 10c is the dual seal of FIG. 8.

Figure 10D:
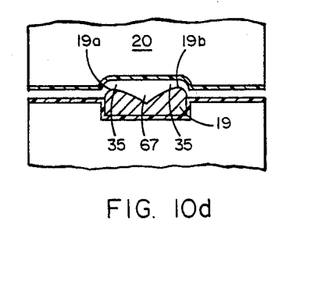

FIG. 10d shows another arrangement of the flat ribbon 19 to obtain dual seals. Here a channel 67 is formed in the ribbon-representing the region where pressure of the pressure plate means 20 is avoided. Seals are formed in the regions 19a and 19b and the melt zone means 35.

FIGS. 6, 7, 8 and 10 show dual seals. If a seal arrangement requiring more than two seals is desired, the number of split zones of the recess means may be increased, or the number of heat element means may be increased. For example, in FIGS. 6c-6d, three or four of the heat element means may be used, and in FIG. 10c a plurality of channels 64 and 67 in FIG. 10d, may be utilized.

Intermittent joints

For some purposes it is desirable to provide intermittent joints. For example, FIG. 11a shows an intermittent edge joint and FIG. 11b shows an intermittent lap joint.

Figure 12A:
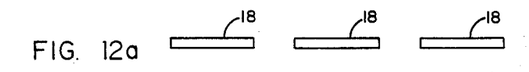
FIGS. 12a and 12b are views of the heat element means showing its arrangement for forming intermittent joints.
Figure 12B:
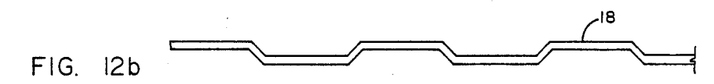

The intermittent joints can be obtained by the arrangement of the heat element means 18 is shown in FIGS. 12a and 12b. FIG. 12a shows the heat element means 18 having a certain length and a plurality of these are provided at spaced intervals. The recess means as required by the present invention will be arranged correspondingly. The heat element means may be a circular wire or a flat ribbon.

Figures 11A, 11B:
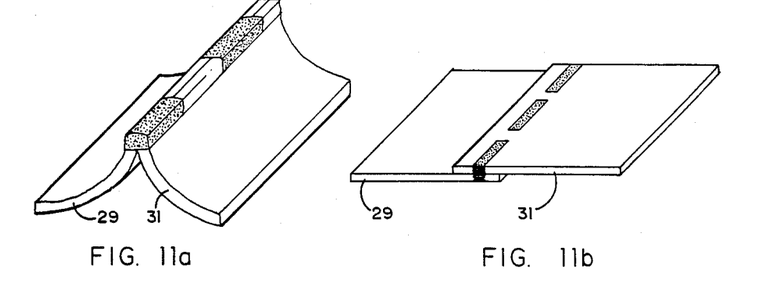
FIG. 11a is a perspective view showing an intermittent edge joint.
FIG. 11b is a perspective view showing an intermittent lap joint.

FIG. 11b shows the heat element 18 having indented portions at spaced intervals. The indented portions would be the non-bonding areas.

Figure 12C:
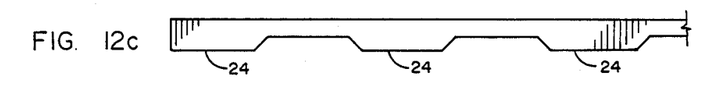
FIG. 12c is a side view of the recess means showing its arrangement for forming intermittent joints.

Instead of indenting the heat element means 18, the recess means 24 may be indented, as shown as FIG. 12c.

Lap joints

The bond of the lap joint may be made by increasing the dimension A in FIG. 3a, i.e., recessing the heat element means further into the support plate to reduce the draw down of the material during melt. The recess dimension B is reduced, i.e., the relief thereof is reduced correspondingly. The relief of the recess means allows for material slippage, and also applies a small amount of pressure on the heat element means and clamping pressure on the material.

Contoured seals

Figures 13A, 13B, 14:
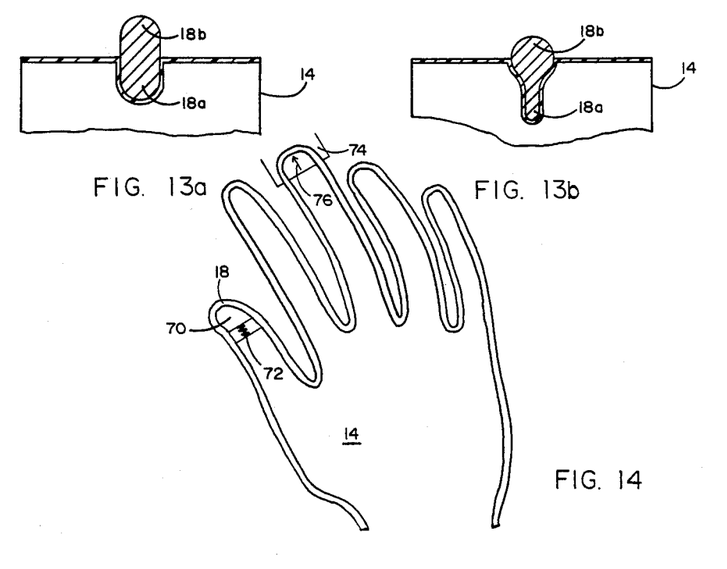
FIG. 14 is a top view of the heat element means configured as a glove.

FIG. 13 shows the heat element means having a shape particularly useful where the bond to be formed is not linear. The heat element means is contoured, for example, to form the glove in FIG. 14. The heat element means as shown in FIG. 13 comprises a support portion 18a which is imbedded within the lower portion 14, and an elongated outer portion 18b having rounded edges. The recess means (not shown) for the heat element means 18b would have a shape to provide a confined melt zone. The provision of the large support portion 18a permits the heat element to be supported within the lower portion 14 while it is contoured to provide different shapes. The rounded edges of outer portion 18b allow for the seal to form around sharp bends.

With the configuration of the heat element means as in FIG. 14, two sheets of the material would be sealed with the seam formed in the shape of the contour. The finished product would be a glove. Similar configurations can be utilized for forming garments, envelopes, etc.

As shown in FIG. 14, the support plate 14 may be provided with expandable tips 70, urged outwardly by springs 72, at places where the heating element 18 rounds sharp curves in the contour. The reason for this arrangement is to prevent buckling of the heating element 18 as it expands linearly wehn heated. Alternatively, a portion 74 of the support plate 14 may be formed of a heat-resistant elastomeric material which is resiliently expandable in the direction of arrow 76.

Glove forming

Figures 15, 16:
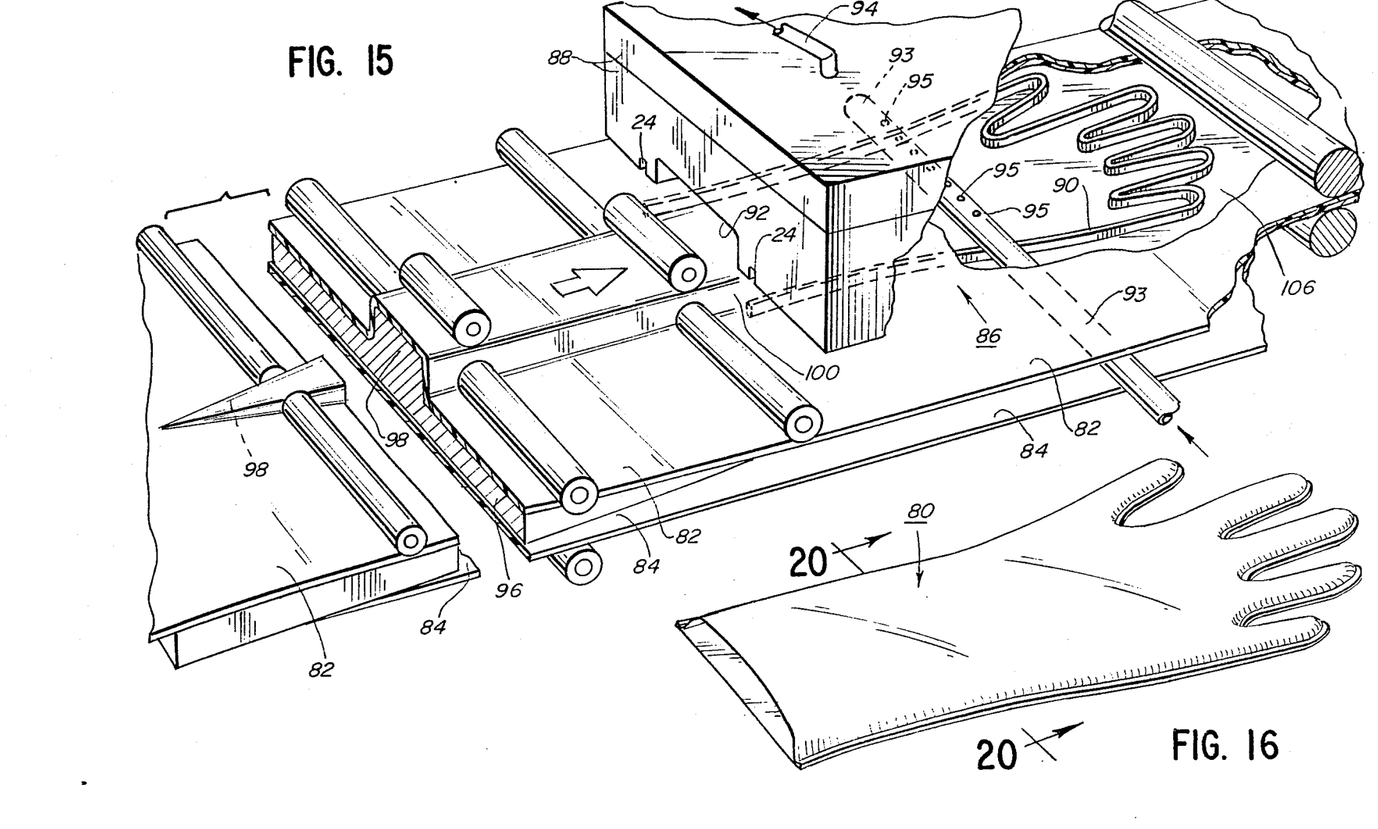
FIG. 15 is a diagrammatic perspective view of an apparatus for forming a glove from two sheets of thermoplastic material in accordance with the principles of the present invention.
FIG. 16 is a perspective view of a glove formed by the apparatus of FIG. 15.

A novel apparatus for forming the glove 80 illustrated in FIG. 16 is illustrated in FIG. 15. Referring to FIG. 15, a top sheet 82 of thermoplastic material and a bottom sheet 84 of thermoplastic material are conveyed, in overlapping relationship, to a mold 86. Mold 86 comprises a pressure means 88 and a heat element 90. Heat element 90 has the longitudinal configuration of the glove to be formed. Pressure means 88 defines a cavity 92, the opening of which faces heat element 90 and also defining recess means 24 as described above in connection with FIG. 2.

A vacuum hose 94 is coupled to pressure means 88 and communicates with cavity 92 in order to evacuate the air from cavity 92 during the operation of the mold. In addition, a hollow mandrel 93, defining a number of openings 95, is used to provide an air jet when the mandrel 93 is in place as illustrated. This aids in avoiding wrinkles or foldovers as the top sheet 82 is pulled upwardly by the vacuum into cavity 92. Mandrel 93 reciprocates inwardly and outwardly so that prior to closure of the mold, the mandrel 93 will be moved out of the way.

As illustrated in FIG. 15, sheet 84 overlies a tapered member 96. Member 96 has a central portion 98 that is raised so that sheet 82 will be centrally raised as illustrated. However, raised portion 98 terminates at plane 100, upstream of pressure means 88, so that sheets 82 and 84 are completely free of member 96 once they reach the mold.

As illustrated in FIG. 15, a number of rollers overlie sheet 82 and also a number of rollers underlie sheet 84.

Figure 17:
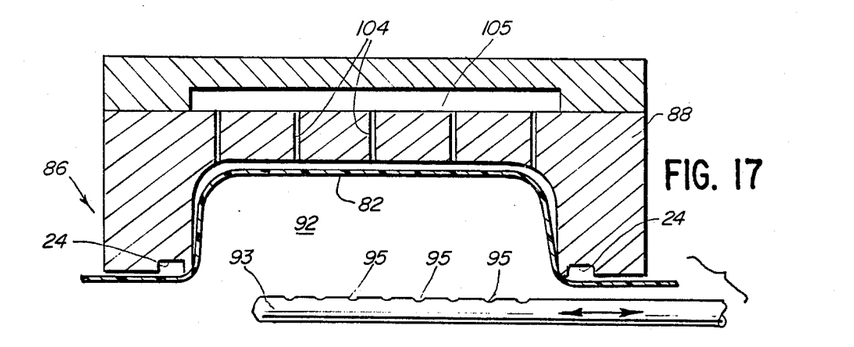
FIG. 17 is a partially broken cross-sectional view of the mold of the apparatus of FIG. 1, shortly prior to thermobonding of the two sheets of thermoplastic material.
Figure 18:
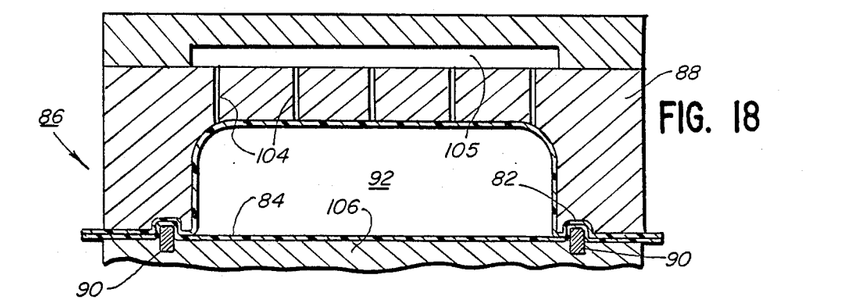
FIG. 18 is a view during thermobonding of the two sheets of thermoplastic material.

Referring to FIGS. 17 and 18, it can be seen that pressure means 88 defines a plurality of channels 104 which communicate with cavity 92 and manifold 105 which communicates with vacuum hose 94. Heat element 90 is supported within support means 106 and is aligned with recesses 24 which are defined by pressure means 88.

In the operation of the apparatus of FIGS. 15 and 17–19, once the pair of thermoplastic sheets 82 and 84 to be thermobonded are within mold 86, pressure means 88 is moved toward heat element 90. During such movement, a vacuum will be drawn by evacuating air via channels 104 and mandrel 93 will provide an air jet under top sheet 82, so that the top sheet 82 will move upwardly, from its position as illustrated in FIG. 17, to a position filling the cavity, as illustrated in FIG. 18. Prior to closure of the mold, hollow mandrel 93 is move out of the mold. Once the top sheet has filled the cavity as illustrated in FIG. 18 and the mold is closed, heat element 90 will be energized to melt the thermoplastic sheets in the configuration of the desired glove seam and to force the melted thermoplastic to flow into and be confined within a melt zone volume 108.

Figures 19, 20, 21:
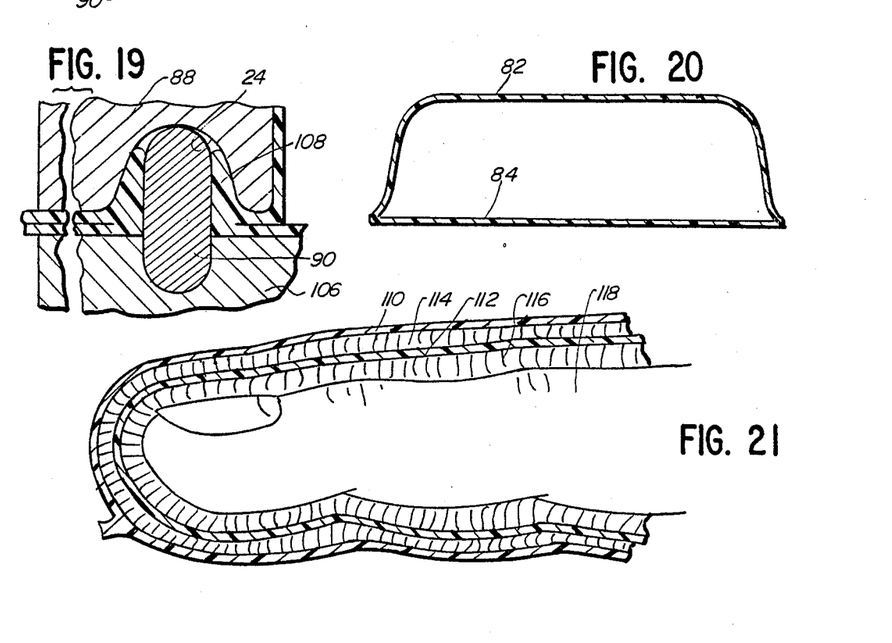
FIG. 19 is a greatly enlarged view of a portion of FIG. 18, showing the pressure means and heat element operating on the sheets of thermoplastic material.
FIG. 20 is a cross-sectional view of the thermobonded glove, taken along the plane of the line 20—20 of FIG. 16.
FIG. 21 is a cross-sectional view of a glove with lining formed using the apparatus of FIG. 15.

As illustrated in FIG. 19, recessed wall 24 is in alignment with heat element 90 and a portion of wall 24 and a portion of heat element 90 apply a crimping pressure on the sheets of thermoplastic material while simultaneously leaving a void between other portions of the recessed wall 24 and heat element 90 to form the melt zone volume 108. The crimping pressure will operate to separate the exterior portions of the now bonded thermoplastic sheets. The resulting glove is illustrated in FIGS. 16 and 20.

It has been discovered that various thermoplastic materials, such as those mentioned above, may readily be used in forming a glove by the apparatus and process of the present invention. It has also been discovered that the use of Tyvek plastic for the glove provides a glove that is highly effective and relatively inexpensive, and that in order to alleviate the perspiration problem that occurs with using a Tyvek plastic glove, it is useful to insert within the Tyvek plastic glove an inner lining formed of a rayon-acetate and manufactured by Chicopee Falls under the trademark Duralace. To this end, the Duralace rayon-acetate inner lining may be manufactured using the apparatus of FIG. 15 in the same manner that the Tyvek outer portion of the glove is manufactured. Once the bonding of the inner lining is completed, it may be simply inserted into the Tyvek plastic outer glove. A cross-section of a resulting glove having a Tyvek plastic outer shell 110, an inner liner 112, an air space 114 separating the Tyvek outer shell 110 from the inner liner 112, and an air space 116 between the inner liner 112 and a finger 118, is illustrated in FIG. 21. It should be understood that FIG. 21 is not to scale, but is for illustrative purposes only.

Operation

With the above device, different type of thermoplastic materials can be bonded together. In some applications adhesive means may be utilized to augment the bond seal. In bonding the thermoplastic material at an edge the bond-material interface is critical for preserving the integrity of the seal bond. Stress at the bond-material is reduced through proper selection of the parameters A, B, C, D and E. The factors that must be considered may be listed as follows:

1. Clamping pressure applied on the material by the upper portion 12. This may be represented as P p.s.i.
2. Heat rise time, i.e., time required for the temperature of the heat element means to rise from its present normal to a given temperature range. This may be represented as $h_t$ seconds.
3. Heat dwell time, i.e., the time period from the beginning of the heat rise time to the end of the cooling time. This may be represented as d seconds. Pressure is kept on during the entire period d.
4. Ambient humidity around the work station. This is represented as H percent. The material itself would be at room temperature and having humidity substantially the same as H.
5. Maximum permissible temperature of the heat element means during the heating state. This may be represented as $t_h$ degrees Fahrenheit and the high of the range of part 2 above.
6. Minimum permissible temperature of the heat element means during the heating stage. This may be represented as $t_l$ degrees Fahrenheit and the low of the range of part 2 above.

With the above factors and the device of the present invention, sheets of thermoplastic material can be joined at a seam with a strong airtight and waterproof seal (even if the material itself is not airtight and waterproof).

In operation, a length of heat element means having a desired cross-sectional configuration is provided. Its length is formed into the shape of the seal to be formed, i.e., linear, curved, shape of a glove, etc. A pressure plate means is provided having recess means, complementarily configured with the heat element means for receiving it. The material is kept at room temperature. The humidity of the material should preferably be substantially similar to the humidity at the work station. The humidity (H) of the work station is maintained between about 27 percent and about 52 percent.

The seam to be formed is positioned and clamped between the heat element means and the recess means. A pressure (P) of between about 20 p.s.i. and about 60 p.s.i. is applied by the pressure plate means. The heat element means is set at an "initial" temperature (T) of between about 58° Fahrenheit and about 72° Fahrenheit. The temperature of the heat element means is raised to a range between a high ($t_h$) of about 340° Fahrenheit and a low ($t_l$) of about 125° Fahrenheit. It can be appreciated that the setting of T determines how fast the heat element means can reach the ($t_h - t_l$) range. The rise is temperature of heat is applied for a time period ($h_t$) of between about 0.38 seconds and about 5.51 seconds and a dwell time (d) of between about 0.53 seconds and about 14.01 seconds.

The material may be between about 6 mil (0.006 inch) and about 10 mol (0.01 inch) thick, and it may be coated or non-coated.

If the material is a Type 1 material fabricated from polyethylene, and made as a sheet about 10 mil thick, for example, like DuPont's 1085, which is coated, the H may be set at about 28, P at about 40, T at about 68, $t_h$ at about 360, $t_l$ at about 150, $h_t$ at about 5.51 and d at about 11.45.

The material may comprise Type 2 material comprising spunbound olefin fibers, such as DuPont's 1444 Tyvek. Tyvek is about 6 mil thick. For this material H may be set at about 29, P at about 60, T at about 69, $t_h$ at about 265, $t_1$ at about 240, $h_t$ at about 4.48 and d at about 9.43. For this material a 0.032 diameter wire may be utilized as the heat element means, with dimension A shown in FIG. 3a being set at 0.01 inches.

A good seal can also be obtained with the above Tyvek 1444-type material by setting H at about 27, P at about 30, T at about 68, $t_h$ at about 165, $t_1$ at about 130, $h_t$ at about 2.00 and d at about 14.10. These settings utilize the same 0.32 diameter wire and 0.01 for A as above.

For Tyvek 1444-type material again, H may be set at about 27, P at about 30, T at about 68, $t_h$ at about 175, $t_1$ at about 140, $h_t$ at about 2.16 and d at about 12.13. These setting also use the 0.032 diameter wire and 0.01 for A.

For Type 3 material, for example, DuPont's Tyvek 1444A-type, H may be set at about 61, P at about 50, T at about 58, $t_h$ at about 200, $t_1$ at about 125, $h_t$ at about 1.08 and d at about 9.01. This uses the same 0.032 diameter wire, but with A being 0.008 inches.

For Type 4 material, for example, DuPont's Tyvek 1443T-type, H may be set at about 52, P at about 30, T at about 62, $t_h$ at about 250, $t_1$ at about 200, $h_t$ at about 0.61 and d at about 1.61. This uses the 0.032 diameter wire with A being 0.008 inches.

The material may comprise Type 5 material comprising polypropylene sheets, similar to Kimberly-Clark's Safeguard and having a thickness of about 10 mil. The Safeguard-type material comprises three layers pressed together. For this material, H may be set about 30, P at about 15, T at about 69, $t_h$ at about 175, $t_1$ at about 125, $h_t$ at about 5.51, and d at about 11.45. Here, an 0.025 diameter wire may be used as the heat element means and A set at 0.008 inches.

For the Type 5 Kimberly-Clark Safeguard-type material, a good seal can also be obtained by setting H at about 50, P at about 20, T at about 68, $t_h$ at about 280, $t_1$ at about 200, $h_t$ at about 0.47, d at about 5.22. A 0.032 diameter wire may be used as the heat element means and A set at 0.01.

The material may comprise Type 6 material, comprising polypropylene sheet similar to Kimberly-Clark's Duraguard, and having 10 mil thickness. For this material, H may be set at about 32, P at about 20, T at about 63, $t_h$ at about 300, $t_1$ at about 200, $h_t$ at about 0.55, d at about 6.25. A 0.032 inch diameter wire may be utilized as the heat element means with A being 0.022 inches.

The material may comprise Type 7 material, comprising rayon and acrylic, similar to Chicopee's Duralace, and about 7 mil thick. For this material H may be set at about 55, P at about 40, T at about 62, $t_h$ at about 340, $t_1$ at about 220, $h_t$ at about 1.65 and d at about 6.62. A 0.032 inch diameter wire may be used with A set at 0.012 inches.

Additionally, for the Duralace-type material, a good seal can be obtained with H set at about 58, P at about 30, T at about 62, $t_h$ at about 220, $t_1$ at about 200, $h_t$ at about 0.38 and d at 0.53. A 0.016 diameter wire may be used as the heat element means with A equal to 0.003 inches.

The material may comprise Type 8 material comprising polypropylene sheets of single layers, similar to Crown Zellerbach's Celestra, of about 6 mil thickness. For this material H may be set at about 54, T at about 64, $t_h$ at about 220, $t_1$ at about 175, $h_t$ at about 1.15 and d at about 4.6. The heat element means may be 0.025 diameter wire with A set at 0.06.

Another type of polypropylene material may be Type 9 material, similar to Evolution #1221056, which is 10 mil thick. For this material H may be set at about 40, T at about 72, $t_h$ at about 180, $t_1$ at about 140, $h_t$ at about 0.88 and d at about 5.03. The heat element for this may be 0.03 diameter wire, with A set at 0.01 inches.

Still another polypropylene material may be DuPont's Typar 3301, whose thickness is about 12 mil. For this material, H may be set at about 42 percent, T at about 71°, $t_h$ at about 230°, $t_1$ at about 150°, $h_t$ at about 1.82 sec, and d at about 5.32 sec.

The above materials and their settings are illustrative of the manner of obtaining good thermobond seals. The following Table I provides an easy reference.

TABLE I

| Mat'l No. | Mat'l. Thickness | Heat Element Type & Size | Recess Depth of Heat Element inch (A) | Coated Humidity (H) | Air (P) Press. p.s.i. | Bar Temp. of (T) | Temperature Setting of High ($t_h$) | Temperature Setting of Low ($t_1$) | Stop Clock (Sec.) Heat $h_t$ | Stop Clock (Sec.) Dwell (d) |
|---|---|---|---|---|---|---|---|---|---|---|
| TYPE 1 (Polyethylene) | 10 mil | ¼" w. ribbon .006 thick | .004 | Yes 28% | 40 | 68° | | | 3.02 | 6.99 |
| TYPE 2 (Polyethylene) | 6 mil | .032 dia. wire | .010 | No 29% | 60 | 69° | 265 | 240 | 4.48 | 9.43 |
| | 6 mil | .032 dia. wire | .010 | No 27% | 30 | 68° | 165 | 130 | 2.00 | 14.10 |
| | 6 mil | .032 dia. wire | .010 | No 27% | 30 | 68° | 175 | 140 | 2.16 | 12.13 |
| TYPE 3 (Polyethylene) | 6 mil | .032 dia. wire | .008 | No 61% | 50 | 58° | 200 | 125 | 1.08 | 9.01 |
| TYPE 4 (Polyethylene) | 6 mil | .030 dia. wire | .008 | No 52% | 30 | 62° | 250 | 200 | 0.61 | 1.61 |
| TYPE 5 (Polypropylene) | 10 mil | .025 dia. wire | .008 | No 30% | 15 | 69° | 175 | 125 | 5.51 | 11.45 |
| | 10 mil | .032 dia. wire | .010 | No 50% | 20 | 68° | 280 | 200 | 0.47 | 5.22 |

TABLE I-continued

| Mat'l No. | Mat'l. Thickness | Heat Element Type & Size | Recess Depth of Heat Element inch (A) | Coated Humidity (H) | Air (P) Press. p.s.i. | Bar Temp. of (T) | Temperature Setting of High ($t_h$) | Temperature Setting of Low ($t_1$) | Stop Clock (Sec.) Heat $h_t$ | Stop Clock (Sec.) Dwell (d) |
|---|---|---|---|---|---|---|---|---|---|---|
| | 10 mil | .032 dia. wire | .010 | No 40%* | 40 | 70° | 180 | 140 | 1.62 | 5.47 |
| TYPE 6 (Polypropylene) | 10 mil | .032 dia. wire | .022 | No 32% | 20 | 63° | 300 | 200 | 0.55 | 6.25 |
| TYPE 7 (Rayon Acrylic) | 7 mil | .032 dia. wire | .012 | No 55% | 40 | 62° | 340 | 220 | 1.65 | 6.62 |
| | 7 mil | .016 dia. wire | .003 | No 58% | 30 | 62° | 220 | 200 | 0.38 | 0.53 |
| TYPE 8 (Polypropylene) | 6 mil | .025 dia. wire | .006 | No 52% | 40 | 64° | 220 | 175 | 1.15 | 4.6 |
| TYPE 9 | 10 mil | .030 dia. wire | .010 | No 40% | 15-30 | 72 | 180 | 140 | 0.88 | 5.03 |
| TYPE 10 (Polypropylene) | 12 mil | .032 dia. wire | .006 (B) .015 (A) | No 42% | 45 | 71° | 230° | 150° | 1.82 | 5.32 |

For other materials not noted above, the proper size and shape of the melt zone means may be selected and the parameters of H, P, T, $t_h$, $t_1$, $h_t$ and d adjusted within the broad range of the present invention and using the device of the present invention. It should be noted that the above method may be used also for fabrics that contain only a percentage of thermoplastic material.

Whereas the present invention has been described with a certain degree of particularly, it should be understood that other and further modifications may be made within the scope and spirit of this invention. The invention is not to be limited to the specific embodiment shown herein, but is to be limited only by the attached claims and each element thereof be entitled to the full range of equivalency.

It should also be noted that the invention is not limited to a specific brand-name material but is applicable generally to materials exemplified by the examples mentioned herein.

What is claimed is:

1. A device for sealing thermoplastic materials which comprises:
   support means for supporting the thermoplastic material to be sealed;
   pressure applying means for applying pressure on the thermoplastic material to be sealed;
   a heat element having a configuration of the seal to be formed;
   said pressure applying means and said heat element being normally spaced to permit introduction of a thermoplastic material therebetween but being operable for pressure engagement to provide thermal sealing of the thermoplastic;
   at least one of said pressure applying means and said heat element having a recessed wall and the other of said pressure applying means and said heat element having a non-planar surface, configured to define a confined melt zone volume between the pressure applying means and the heat element when they are in mating relationship and are operating to seal the thermoplastic material; and
   means for energizing said heat element for providing heat to the thermoplastic material while said pressure applying means and said heat element are in pressure engagement whereby the melted thermoplastic is forced to flow into and be confined within the melt zone volume.

2. The device of claim 1, wherein said recessed wall is provided in said pressure means for receiving said heat element and confining said thermoplastic material therebetween.

3. The device of claim 1, wherein said support means and said pressure means are each provided with a layer of insulating material.

4. The device of claim 1, wherein said support means and said pressure means are each provided with a layer of insulative material actings as a flow channel to control the melt flow of the material in said melt zone volume.

5. The device of claim 1, wherein said heat element is provided with an imbedded heating means.

6. The device of claim 2, wherein said recess means is provided with heating means imbedded below the surface thereof.

7. The device of claim 2 wherein said heat element and said recess means are each provided with heating means imbedded below the surface thereof.

8. The device of claim 7 wherein each of said heating means are independently controlled.

9. The device of claim 2, further including a crimping zone formed between said heat element and recess means when they are in a mating relationship.

10. The device of claim 2, wherein at least two melt zones are provided further including a crimping zone formed between said heat element and recess means when they are in a mating relationship, said crimping zone being positioned between said two melt zones.

11. The device of claim 2 wherein said recess means comprise first and second recess means, each configured to mate with a selected portion of said heat element, and melt zones are formed between said heat element and at least one of said recess means.

12. The device of claim 11, wherein said first and second recess means are provided with heating means imbedded below the surface thereof.

13. The device of claim 1, wherein said heat element comprises a support portion for holding said heat element in position and an outer portion received within the recess means.

14. The device of claim 1, wherein said heat element has selected length and a plurality thereof are provided at spaced apart intervals for forming intermittent joints in said material.

15. The device of claim 1, wherein said heat element has a selected length and selected portions thereof are indented at spaced intervals to form intermittent joints in said material.

16. The device of claim 2 wherein said recess means has selected portions thereof indented at spaced intervals along the length thereof for forming intermittent joints in said material.

17. The device of claim 1, comprising a plurality of elongated heat elements transversely spaced from one another.

18. The device of claim 1, in which said heat element has channel means longitudinally formed therein to provide a zone in which no pressure is applied to said material when said heat element means and said pressure plate means are mated.

19. The device of claim 1, in which said heat element is configured to a generally finger-like contour, and said support means are resiliently expandable to accommodate expansion of said heat element in the longitudinal direction of said contour when heated.

20. Apparatus for forming a garment or glove from two sheets of thermoplastic material, which comprises:
a mold including pressure means and a heat element;
said pressure means being operable for providing pressure on both thermoplastic sheets;
said heat element having the longitudinal configuration of the desired garment or glove to be formed;
said pressure means defining a cavity having an opening facing the heat element;
at least one of said pressure means and said heat element having a recessed wall and the other of said pressure applying means and said heat element having a non-planar surface, configured to define a melt zone volume between said pressure means and said heat element;
means for conveying both sheets, in overlying relationship, to the mold, between the pressure means and the heat element;
said pressure means and heat element being configured to provide said confined melt zone volume between the pressure means and the heat element when the pressure means and heat element are in a mating relationship and are operating with the sheets of thermoplastic material;
means for evacuating air from the cavity to draw a portion of one of the sheets into the cavity;
means for applying pressure on one side of the sheets by the pressure means while the heat element on the opposite side of the sheets is operating to provide heat to the sheets to melt the thermoplastic material in the configuration of the desired garment or glove and to force the melted thermoplastic to flow into and be confined within the melt zone volume.

21. Apparatus as described in claim 20, including means for providing an air jet under said one sheet as it is drawn into the cavity.

22. Apparatus as described in claim 20, in which the conveying means comprises means for conveying separated sheets toward the mold with the separated sheets becoming closer to each other as they approach the mold.

23. Apparatus as described in claim 20, in which said pressure means defines recessed wall configured to define said melt zone volume between said pressure means and said heat element when said pressure means and heat element are operating with the thermoplastic material, said heat element having a curvilinear cross-section configuration and said recessed wall being in alignment with the heat element whereby, during operation of the pressure means and the heat element on the sheets of thermoplastic material, an portion of the recessed wall and a portion of the heat element will apply a crimping pressure on the thermoplastic material and simultaneously leave a void between other portions of the recessed wall and the heat element to form the melt zone volume.

* * * * *